(12) United States Patent
Haverlock et al.

(10) Patent No.: US 9,734,261 B2
(45) Date of Patent: Aug. 15, 2017

(54) CONTEXT AWARE QUERY SELECTION

(71) Applicant: International Business Machines Corporation, Armonk, NY (US)

(72) Inventors: Kevin B. Haverlock, Cary, NC (US); Mark Marrara, Round Rock, TX (US); Dan O'Connor, Milton, MA (US); William G. O'Keeffe, Tewksbury, MA (US); Cale Vardy, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/081,182

(22) Filed: Mar. 25, 2016

(65) Prior Publication Data
US 2016/0203193 A1 Jul. 14, 2016

Related U.S. Application Data

(63) Continuation of application No. 14/529,874, filed on Oct. 31, 2014, now Pat. No. 9,576,075.

(51) Int. Cl.
*G06F 17/30* (2006.01)
(52) U.S. Cl.
CPC .. *G06F 17/30973* (2013.01); *G06F 17/30528* (2013.01); *G06F 17/30554* (2013.01); *G06F 17/30864* (2013.01)
(58) Field of Classification Search
CPC ......... G06F 17/30528; G06F 17/30554; G06F 17/3064; G06F 17/30864; G06F 17/30873; G06F 17/30899; G06F 17/30917; G06F 17/30976; G06F 9/4446; G06F 3/0482

USPC ........ 707/766, 767, 768, 771, 779; 715/708, 715/712, 714
See application file for complete search history.

(56) References Cited

U.S. PATENT DOCUMENTS

| 7,343,307 | B1* | 3/2008 | Childress | G06Q 10/087 705/2 |
| 7,543,232 | B2* | 6/2009 | Easton, Jr. | G06F 9/4446 715/705 |
| 7,849,405 | B1* | 12/2010 | Coletta | G06F 9/4446 715/708 |

(Continued)

OTHER PUBLICATIONS

Lu et al., Question Answering System Based on Web, Intelligent Computation Technology and Automation (ICICTA), 2012 Fifth International Conference on Year: 2012 pp. 573-576.*

*Primary Examiner* — Greta Robinson
(74) *Attorney, Agent, or Firm* — DeLizio Law, PLLC

(57) ABSTRACT

Context data is determined for a web page. The context data includes textual data that describes subject matter displayed on the web page. A client query is retrieved from a client-retrieved instance of the web page. An identifier associated with the web page capable of distinguishing the web page from other web pages is determined. In response to receiving the client query, a plurality of queries are retrieved from a database. Whether one or more of the retrieved queries correlate the determined web page context and the received client query is determined. A set of one or more queries from the plurality of queries is selected based on the selected set of queries each having been determined to correlate the web page context data and the client query. The selected set of the plurality of the queries is sent to the client-retrieved instance of the web page.

8 Claims, 5 Drawing Sheets

(56) References Cited

U.S. PATENT DOCUMENTS

| | | |
|---|---|---|
| 8,060,513 B2 | 11/2011 | Basco et al. |
| 8,484,015 B1 * | 7/2013 | Wolfram ........... G06F 17/30693 |
| | | 704/1 |
| 2009/0077071 A1 | 3/2009 | Mishkanian et al. |
| 2015/0161230 A1 * | 6/2015 | Alkov ............... G06F 17/30705 |
| | | 707/737 |
| 2015/0186515 A1 * | 7/2015 | Rao ................... G06F 17/30864 |
| | | 707/610 |

* cited by examiner

CONTEXT AWARE QUERY SELECTION

RELATED APPLICATIONS

This application is a continuation of, and claims the priority benefit of, U.S. patent application Ser. No. 14/529,874 filed Oct. 31, 2014.

BACKGROUND

Embodiments of the inventive subject matter generally relate to the field of computer systems, and, more particularly, to the use of page level context to facilitate in the operation of a question answering system.

When users enter search queries through a web page, the page may produce search query suggestions based on the characters already typed by the users. Usually, the suggested queries returned are the queries searched for most often. Other services, however, may use data from the web page to identify the context of the query and return search query suggestions based on that context.

SUMMARY

Embodiments for generating a query list generally include a method that identifies, retrieves, or otherwise determines and processes web page context data. The web page context data includes textual data that describes subject matter displayed on the web page. The method further includes receiving or otherwise accessing a client query entered from a client-retrieved instance of the web page and determining an identifier associated with the web page that distinguishes the web page from other web pages. In response to receiving the client query, multiple queries associated with the identifier are retrieving from a database. A set of one or more queries is selected from the set of retrieved queries based on each of the selected set of queries correlating the determined webpage context data and the received client query. The selected set of queries is sent to the client-retrieved instance of the web page.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes systems, methods, techniques, instruction sequences and computer program products that embody techniques of the present inventive subject matter. However, it is understood that the described embodiments may be practiced without these specific details. Well-known instruction instances, protocols, structures and techniques have not been shown in detail in order not to obfuscate the description.

A question answering system (QA system) processes client query submissions by providing answers and also suggesting other queries that may be helpful to a user. The quality of the answer and suggested queries are typically dependent on the detail of the query itself. The quality, however, can be improved by also considering the context in which the query was submitted. Context can be derived from an interface that receives the query and query history corresponding to the interface and/or clients/users. The quality of suggested queries may also be improved by analyzing which queries have been submitted via other client applications and/or by other users. By considering the context in which queries are submitted by numbers of clients/users, a QA system can return more relevant answers and suggested queries.

Figure 1:
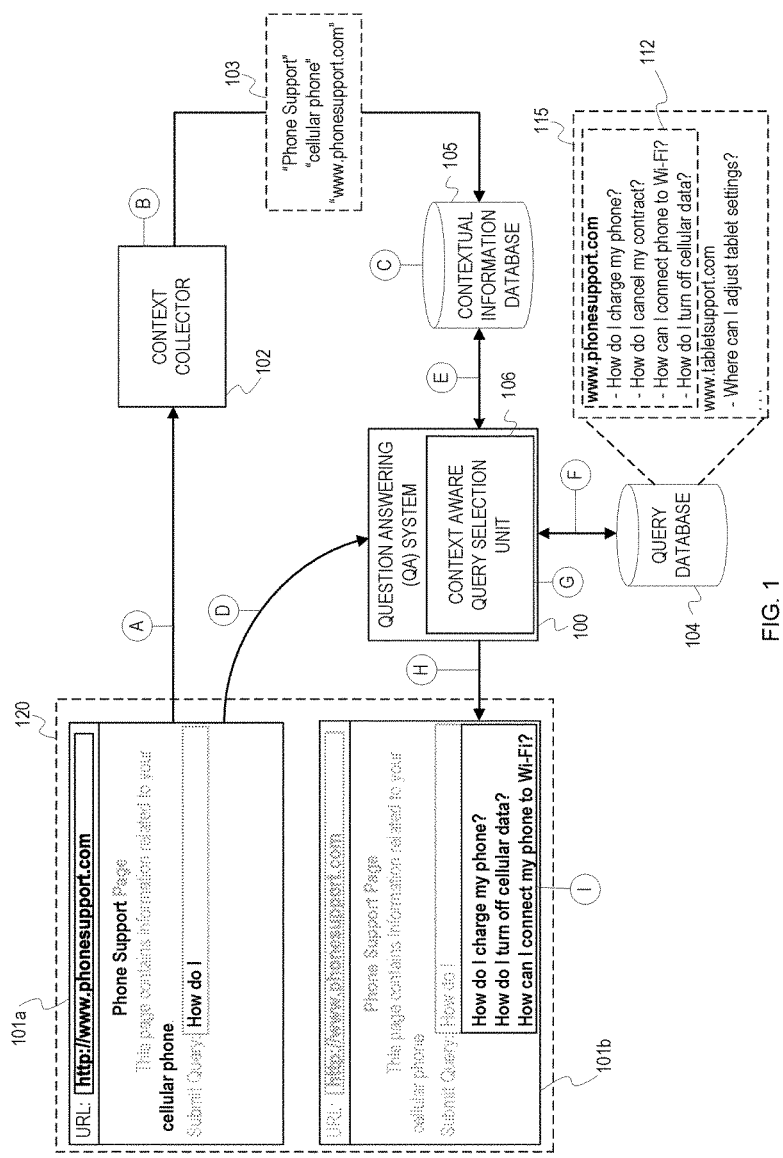
FIG. 1 is a conceptual diagram illustrating an example query selection system that uses contextual information in the operation of a QA system.

FIG. 1 is a conceptual diagram illustrating an example query selection system that uses contextual information in the operation of a QA system 100. The depicted query selection system includes QA system 100, a context collector 102, contextual information 103, a query database 104 and a contextual information database 105. As explained in further detail below, context collector 102 is a component that may execute on a server or a client device to provide contextual information to context aware query selection unit 106 within QA system 100. FIG. 1 also depicts a web page state 101a retrieved by a web browser (not expressly depicted) within a client device 120, and containing the content of a client/user query that has been entered from the client-retrieved instance of a web page addressed at URL http://www.phonesupport.com. In accordance with the depicted embodiment, the client query content contained within web page state 101a is retrieved before any selected queries have been returned from QA system 100. Web page state 101b contains selected queries that have been returned.

FIG. 1 depicts a series of steps A-I that illustrate example operations performed in accordance with an embodiment of the invention. At step A, context collector 102 retrieves or otherwise accesses web page data and client query data from the web page having a URL address http://www.phonesupport.com. If loaded on and executing from a client or a server, context collector 102 may retrieve the web page context data from a particular web/file server storage location, such as via a URL associated with the web page. If loaded on and executing from client device 120, context collector 102 may retrieve the web page data in association with the client query data submitted from the client-retrieved instance of the web page within web page state 101a. In addition to the page URL, the retrieved web page data may include text, image data, web page metadata, links to other web pages, or similar data from the linked web pages. In FIG. 1, the retrieved web page data includes textual data that describes subject matter displayed on the web page including the text displayed in web page state 101a and the URL of the web page.

At step B, context collector 102 identifies contextual information 103 based on the retrieved web page data. For example, context collector 102 may process text within specified web page data fields to identify contextual information 103. Such text processing may include identifying specific terms that provide context, and/or distinguishing the web page terms grammatically (e.g., verbs or nouns). As another example, context collector 102 may identify contextual information 103 in accordance with text field positions or categories such as web page titles and headings.

Contextual information 103 may include the domain of the web page, the specific web page URL, prior queries associated with a specified user or client ID, or prior queries associated with other users or client IDs. In the depicted embodiment, contextual information 103 includes text data from the web page heading, text data from the body of the web page, and the URL of the web page, "Phone Support," "cellular phone," and "www.phonesupport.com," respectively.

At step C, context collector 102 provides contextual information 103 to be stored within contextual information database 105 for subsequent access and use by QA system 100. Contextual information database 105 may store contextual information 103 in association with an identifier such as a URL tag that distinguishes the web page from other web pages. The collection and tagged storage of contextual information in this manner by context collector 102 may be cumulative, enabling QA system 100 to access and retrieve a variety of contextual information by type and content stored in association with respective URL tags within contextual information database 105.

At step D, QA system 100 reads or otherwise accesses information describing the client query, typically entered by a user within web page state 101a. The client query may be received and processed in its entirety or may be received and processed incrementally. For example, a query of "how do I charge my device?" may be received and processed as a whole, or a first part of "how do I" may be received and processed followed by receiving and processing a second part of "charge my device?". Additionally, QA system 100 may receive and process web page identification data along with the client query including the web page URL, the internet protocol ("IP") address of the web page interface, and/or contextual words. Upon receiving the client query, QA system 100 may perform text processing on the client query to determine the answer type, focus, or lexical answer type of the query. For example, in the depicted embodiment, QA system 100 receives an initial portion "how do I" of a client query and may accordingly determine that the answer type is procedural.

At step E, QA system 100 retrieves contextual information 103 from contextual information database 105 in response to reading or otherwise receiving a copy of or accessing the client query from web page state 101a. QA system 100 uses an identifier tag such as the URL of the web page to which the query was submitted to retrieve contextual information 103. At step D, for example, QA system 100 receives the URL "http://www.phonesupport.com" along with the query. At step E, QA system 100 retrieves contextual information 103 that has been tagged in association with the URL within contextual information database 105. QA system 100 may also locate contextual information 103 within contextual information database 105 using a website domain or other network address information received as part of the client query. In processing the detected client query, QA system 100 may also retrieve other data from contextual information database 105, such as contextual words for a URL. For example, QA system 100 may retrieve contextual words such as "phone charging" and "data connection" that have been associated with the URL and stored in contextual information database 105.

At step F, QA system 100 retrieves a query list 112 from query database 104 in response to receiving the client query. Query database 104 contains lists of queries 115 that are each associated with one or more specified web pages. Each of the query lists 115 may be associated with a given web page via having previously been submitted on the web page, or by having been determined by QA system 100 to be related to the web page, or by having been manually associated with the web page. Each of query lists 115 may also be associated via a URL/IP address with a website domain. If no query lists or queries are associated with the web page, QA system 100 may retrieve queries from a generic query database. In the illustration of FIG. 1, a list of four queries has been associated with the web page "www.phonesupport.com." The list of four queries is retrieved by QA system 100 using the web page URL specified in the query received at step D. Other queries not tagged to the web page, such as those tagged to "www.tabletsupport.com," are not retrieved.

At step G, context aware query selection unit 106 (selection unit 106) selects a set of one or more of the retrieved queries within query list 112 to be sent to the client browser for presentation within web page state 101b. Selection unit 106 selects the one or more queries based, at least in part, on whether and to what extent each of the retrieved queries correlate the client query received at step D with contextual information 103 specific to the web page. In determining which queries to select, selection unit 106 may also analyze data such as relevance of a given query to contextual information 103, the number of times a particular query has been submitted by one or more web clients, or whether QA system 100 has a specified answer to a query. In the depicted embodiment, selection unit 106 compares contextual information 103 and the client query to queries within query list 112. The queries that correlate contextual information 103 and the client query are identified to be selected queries. For example, the query "how do I charge my phone?" is identified as a selected query because the query correlates contextual information 103 with the client query by including the context word "phone" and by being a procedural question such as "how do I." The query "how do I cancel my contract?," however, will not be a selected query because the query does not fit into the context indicated by contextual information 103 as the context of the query indicates that the query relates to cellular service plans and not the use of cellular phones. The other queries, "how do I turn off cellular data?," and "how can I connect my phone to Wi-Fi?," are identified as selected queries because they correlate the client query with contextual information 103 by relating to the context of cellular phones and being procedural type queries.

At step H, QA system 100 sends the selected queries to web page state 101b over a network, such as the Internet, or other type of networked data connection. The number of selected queries sent may vary based on the number of selected queries identified, a number of queries requested by the web page, or the amount of available bandwidth with which to send the queries. Before sending the selected queries, QA system 100 may place the selected queries in a particular order. The order of the selected queries may vary based on the relevance of the selected query to contextual information 103, whether there is a known answer for a selected query, and the number of times a selected query has been submitted by other client devices. In the depicted embodiment, three selected queries are sent to web page state 101b within client device 120.

At step I, the selected queries are displayed to the user. The selected queries are displayed in a manner dictated by web page state 101b. In the depicted embodiment, the selected queries are displayed below the text field for entering a query, so a client may identify a selected query for submission. The selected queries may be displayed in any other manner as dictated by a web page's programming.

In some implementations, steps D, G, H, and I will be performed multiple times in succession. In step D, QA system 100 may receive the query incrementally as the query is entered. For example, in the depicted embodiment, QA system 100 receives a portion of a query "how do I." QA system 100 may later receive an additional query portion such as "restart," making the total received query "how do I restart." At this point, steps G, H, and I will be performed again and new queries will be selected based on the additional information received.

In some implementations, context collector 102 will not have analyzed the web page data at an earlier point in time. Therefore, context collector 102 will not have generated and stored contextual information 103 in contextual information database 105 for use by QA system 100. In such an implementation, context collector 102 may communicate directly with QA system 100 to provide contextual information 103 as need by QA system 100. Such an implementation may improve the time taken to identify selected queries and reduce overhead by not maintaining contextual information database 105.

In some implementations, QA system 100 displays selected queries immediately upon a user reaching a web page and before any query has been received. This allows for a client to identify a selected query without having to enter a query manually. Context aware query selection unit 106 may use contextual information 103 for the web page to populate the list of selected queries.

Figure 2:
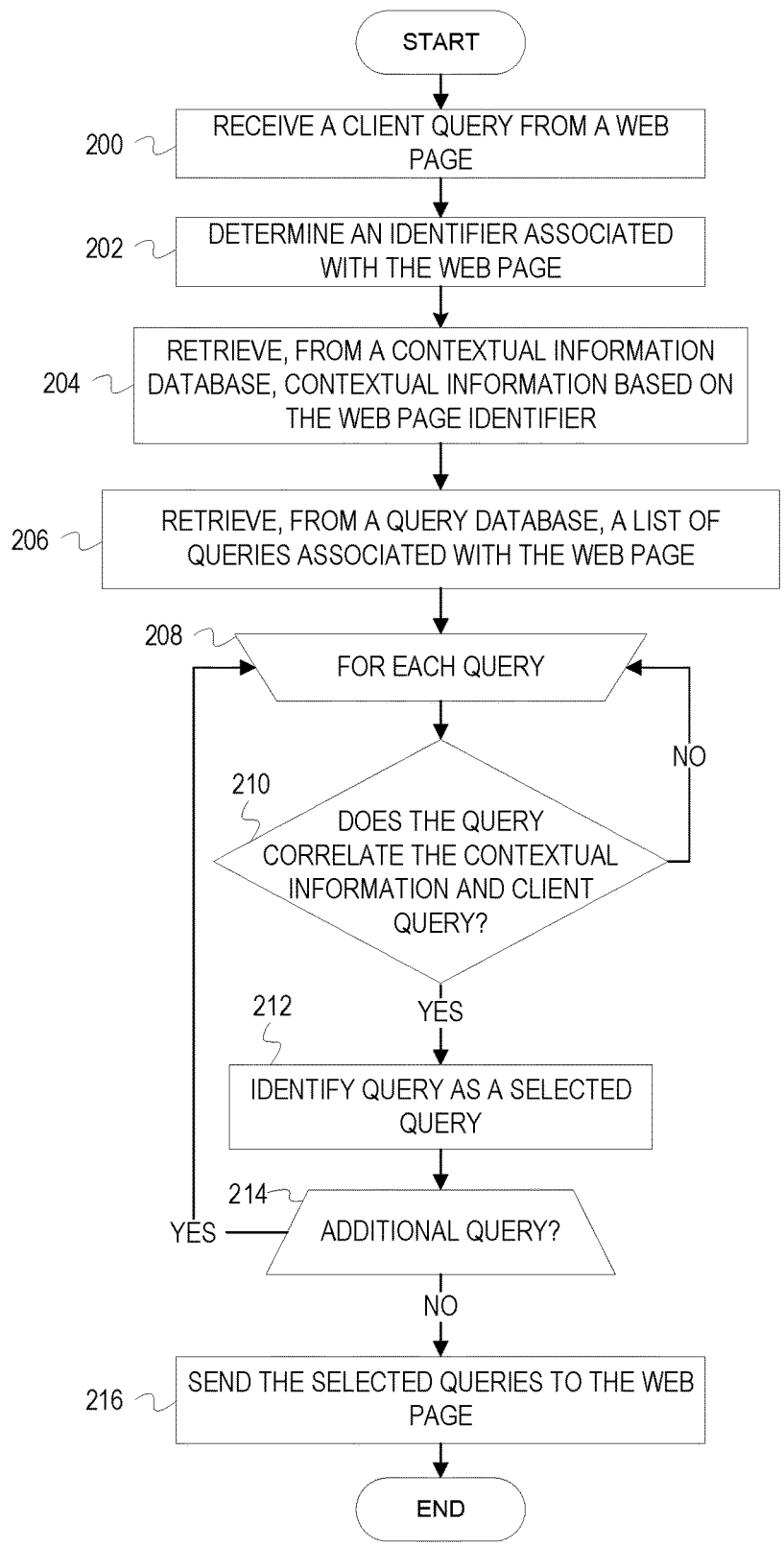
FIG. 2 is a flow diagram illustrating example operations for selecting queries using contextual information.

FIG. 2 depicts a flow diagram illustrating example operations for selecting queries using contextual information. The operations depicted in FIG. 2 can be performed by QA system 100 depicted in FIG. 1 but is not limited to the implementations described above.

At block 200, a client query is received from a web page. A client query may be received directly by a QA system or by a separate module. The separate module may perform text processing or parse the client query before sending the query to a QA system. A query may also be received from a source other than a web page. For example, a query may be received from a software application that displays information running on a cellular phone or computer. Once a query is received, control then flows to block 202.

At block 202, an identifier associated with a web page is determined. The web page identifier may be determined based on data received along with the query. The web page identifier may be a URL, an IP address, or any type of unique identifier associated with the web page. Once the web page interface identifier has been determined, control then flows to block 204.

At block 204, contextual information is retrieved from a contextual information database. Contextual information stored in the contextual information database is tagged with an identifier. For example, the contextual information may be tagged with the web page identifier determined at block 202, so the web page identifier may then be used to retrieve contextual information from the contextual information database. The contextual information may also be tagged with other data such as a website domain, contextual words, or any type of identifier capable of distinguishing the contextual information. Once the contextual information has been retrieved, control then flows to block 206.

At block 206, a list of queries associated with the web page is retrieved from a query database. The query database contains lists of queries that have been associated with a web page. The queries may be retrieved using the web page identifier or other information associated with the queries. If there are no queries associated with the web page, queries can be retrieved from a generic query database. The generic query database contains lists of queries that, while not associated with a web page, may be associated with contextual words such as "cellular phones," "desktop computers," "laptops," etc. Once a list of queries has been retrieved, control then flows to block 208.

At block 208, operations begin for the list of queries. During the first pass through block 208, a first query is iterated over. On each subsequent pass through block 208, the query is updated to be a next query. Operations continue until all queries have been iterated over. In some implementations, operations may terminate once a number of queries have been iterated over or upon the satisfaction of some condition. After a query to be iterated over is determined, control then flows to block 210.

At block 210, it is determined whether the query correlates the contextual information and the client query. In general the query correlates the contextual information with the client query if the query contains words that indicate a context similar to that indicated by the contextual information and is of a similar answer type. In some implementations, the query may only be related to the contextual information if it surpasses a degree of relevance threshold. The query's degree of relevance may be determined by determining the amount of the contextual information contained in the query or by performing text processing on a query and comparing the results to the contextual information. If, for example, the query only contains one word in common with the contextual information, the query may have a low degree of relevance and will not exceed a degree of relevance threshold. In addition to determining whether the query correlates the contextual information with the client query, in some implementations, it may be determined whether the query has been received a certain number of times, how recently a query similar to the query was submitted, or whether the query has a known answer. If the query does not correlate the contextual information with the client query, control then returns to block 208. If the query does correlate the contextual information with the client query, control then flows to block 212.

At block 212, the query is identified as a selected query. The query may be identified as a selected query by adding the query to a list of selected queries or by flagging a bit associated with the query. After the query is identified as a selected query, control then flows to block 214.

At block 214, it is determined whether there is an additional query. If there is an additional query, control then returns to block 208. If there is not an additional query, control then flows to block 216.

At block 216, the selected queries are sent to the web page interface. The number of selected queries sent may vary based on the number of selected queries identified at block 212, a number of selected queries requested by the web page, or the amount of available bandwidth with which to send the selected queries. After the selected queries are sent to the web page, the process ends.

Figure 3:
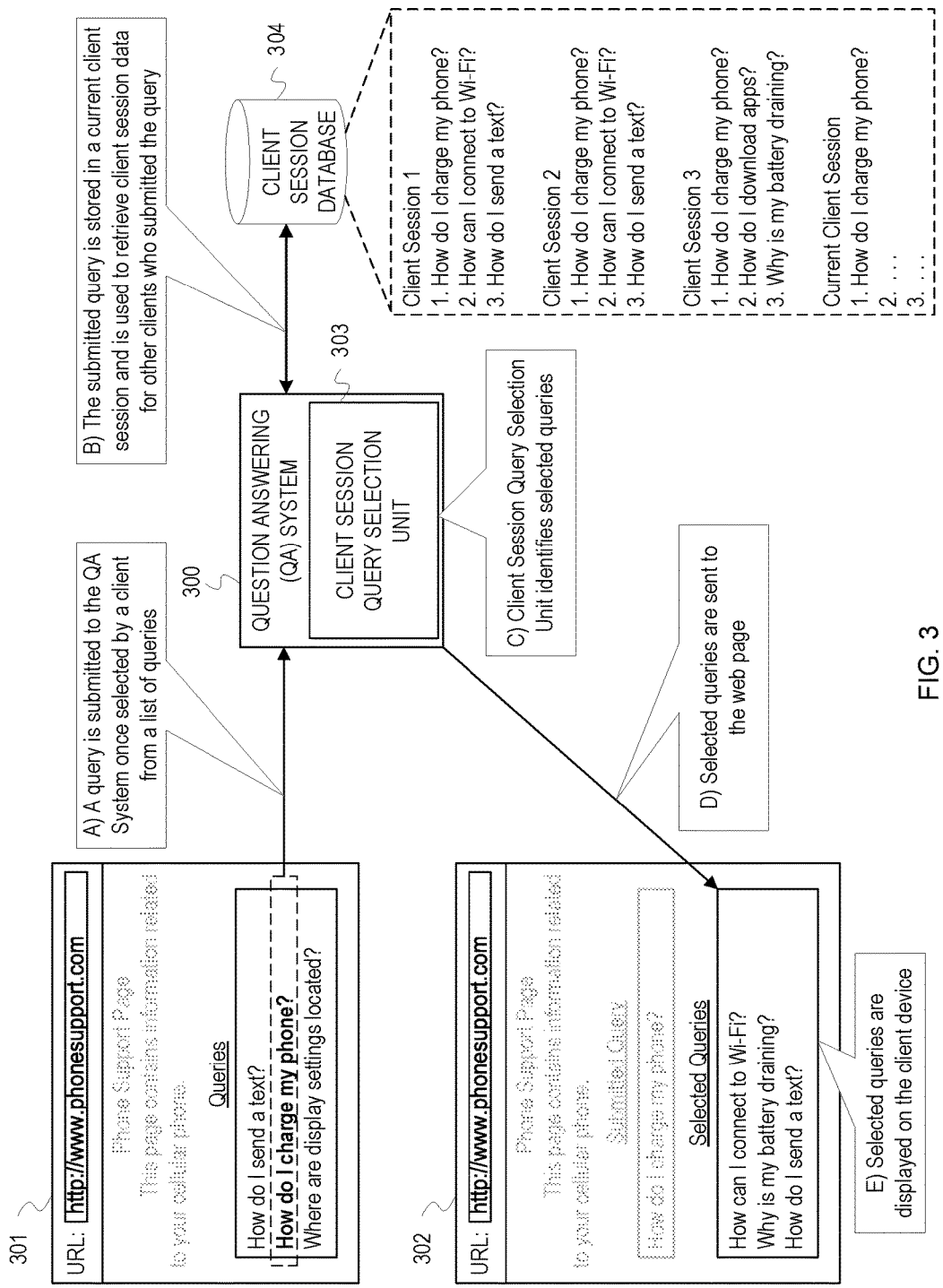
FIG. 3 is a conceptual diagram illustrating an example query selection system that utilizes client session data in the operation of a QA system.

FIG. 3 is a conceptual diagram illustrating an example query selection system that uses client session data in the operation of a QA system 300. The depicted query recommendation system includes QA system 300 and client session database 304. QA system 300 includes client session query selection unit 303. FIG. 3 also depicts a web page 301 and a web page 302.

FIG. 3 depicts a series of steps A-E that illustrate example operations performed in accordance with an embodiment of the invention. At step A, a query is sent to QA system 300. The query is selected by a client from a list of one or more queries contained within web page 301. The list of queries may be populated from a generic query database, with frequently submitted queries, or with queries related to contextual information of web page 301. In the depicted embodiment, the query "how do I charge my phone?" has been selected from the list of queries and submitted to QA system 300.

At step B, QA system 300 stores the submitted query in client session database 304 and retrieves client session data using the selected query. Client session data is a record of the queries submitted by a client during a session with QA system 300. For example, a client may browse to a web page and submit three queries before browsing away from the web page. The client session data would include the three queries submitted and the order in which the queries were submitted. The client session data may include other data such as the date and time a query was submitted, whether an answer was identified for the query, and whether the answer to the query has a favorable rating. In the depicted embodiment, client session database 304 contains client session data for three prior clients. Additionally, a new client session data entry has been created for the current client and the submitted query has been stored. Each new query submitted by the current client will be stored in the client session data entry. In addition to storing the submitted query, QA system 300 uses the submitted query to retrieve client session data. QA system 300 may identify other client sessions where the same or similar query was submitted and then retrieve the client session data for those sessions. Client session data may also be associated with a URL. In such implementations, QA system 300 may use the URL where the submitted query originated to retrieve all client session data for that URL.

At step C, client session query selection unit 303 (selection unit 303) identifies selected queries. Selection unit 303 analyzes the retrieved client session data to determine which queries to identify as recommend queries. Selection unit 303 may determine from the retrieved client session data which query is most often submitted by a client after the submitted query. For example, in the depicted embodiment, the selection unit 303 identifies that the query "how can I connect to Wi-Fi?" is the query most often submitted after the submission of the query "how do I charge my phone?". In addition to identifying the query most often submitted next, selection unit 303 may determine which queries in the retrieved client session data relate to the context of the submitted query. Contextual information can be determined for the submitted query by analyzing the text of the submitted query. Selection unit 303 can then use the contextual information to find related queries. For example, in the depicted embodiment, the contextual information determined for the submitted query "how do I charge my phone?" may be context words such as "charging" or "battery life." The contextual information is then used to identify the query "why is my battery draining?" Even though the query is not most often submitted next, the query "why is my battery draining?" is identified as a selected query because the query relates to the context of the submitted query.

At step D, the selected queries are sent to web page 302. The selected queries are typically sent after an answer to the submitted query is sent, as this is likely when a client is ready to submit another query. The selected queries may be sent along with other data such as an order in which the queries may be displayed, the number of selected queries identified, and the quality of known answers for each query.

At step E, the selected queries are displayed on a client device. Typically, an answer for the submitted query has already been returned and displayed, and now, web page 302 displays selected queries for the client to submit next. In the depicted embodiment, the selected queries are displayed in the order with the most likely to be submitted next query at the top and the least likely to be submitted next query at the bottom. However, the queries may be displayed in any order as determined by web page 302. The queries may be sorted according to other data such as the number of times a query has been submitted, the queries most recently submitted by other clients, and the quality of known answers for each query.

In some implementations, a client may manually enter the query to be sent to QA system 300 instead of selecting a query from a list of selected queries. In such an implementation, QA system 300 may perform text processing on the submitted query in order to determine a lexical answer type, focus, or other identifier for the query. The query identifier may then be used to retrieve data from the client session database 304. QA system 300 would then continue to perform the other operations as described.

Figure 4:
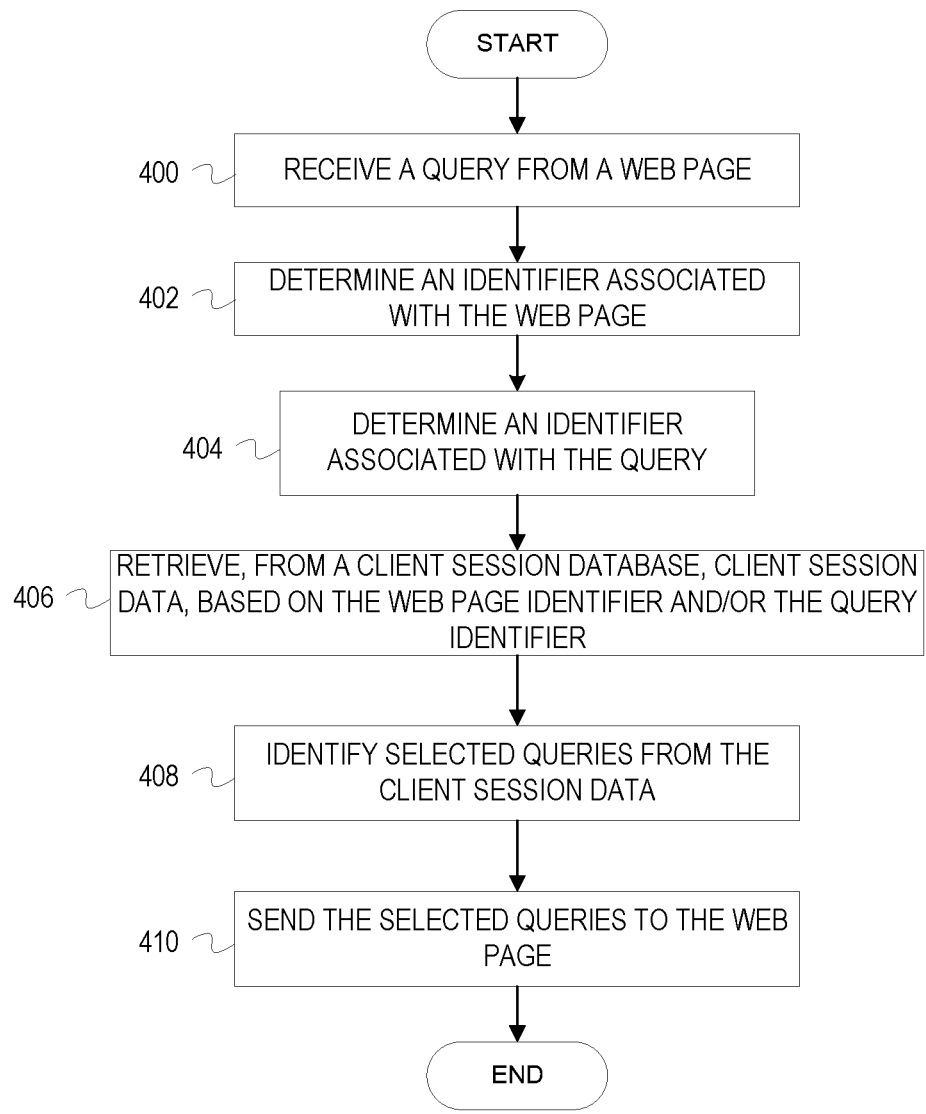
FIG. 4 is a flow diagram illustrating example operations for selecting queries using client session data.

FIG. 4 depicts a flow diagram illustrating example operations for generating selected queries using client session data. The operations depicted in FIG. 4 can be performed by QA system 300 depicted in FIG. 3 but is not limited to the implementations described above.

At block 400, a query is received from a web page. The query may be received similarly to how a query is received at block 200 of FIG. 2. Additionally, a query may be received after being selected from a list of queries. Once a query is received, control then flows to block 402.

At block 402, an identifier associated with a web page is determined. The web page identifier may be determined similarly to how a web page identifier is determined at block 202 of FIG. 2. Once the web page identifier has been determined, control then flows to block 404.

At block 404, an identifier associated with the query is determined. A query identifier may be any identifier capable of distinguishing the query from another, such as the text of the query itself. Additionally, the query identifier may be contextual information derived from the query text or may be a lexical answer type or a focus of the query determined by performing text processing. Once a query identifier has been determined, control then flows to block 406.

At block 406, client session data is retrieved from a client session database. The client session data is based, at least in part, on the web page identifier and/or the query identifier. Client session data may be retrieved using the query identifier, the web page identifier, or both. If a query in the client session data has the same or similar identifier as the query identifier determined at block 404, the client session data containing the query is retrieved. Also, client session data may be retrieved if it is associated with a web page identifier that is the same or similar to the web page identifier determined at block 402. After the client session data is retrieved, control then flows to block 408.

At block 408, selected queries are identified from the client session data. Selected queries may be identified similarly to how selected queries were identified in the description of FIG. 3. Once the selected queries are identified, control then flows to block 410.

At block 410, the selected queries are sent to the web page. The selected queries may be sent similarly to how the selected queries are sent in block 210 of FIG. 2. However, the queries may be sent in the order from the query most likely to be submitted next to the query least likely to be submitted next. Also, the selected queries may be sent along with other data such as an order in which the queries may be displayed, the number of selected queries identified, and the quality of known answers for each query. After the selected queries are sent to the web page, the process ends.

It should be noted that the operations described in the flow diagrams (FIG. 2 and FIG. 4) are examples meant to aid in understanding embodiments, and should not be used to limit embodiments or limit scope of the claims. Embodiments may perform additional operations, fewer operations, operations in a different order, operations in parallel, and some operations differently. For example, contextual information may be retrieved from a contextual information database (block 204, FIG. 2) after or in parallel with retrieving a list of queries from a query database (block 206 of FIG. 2). As another example, an identifier may be determined for a web page (block 402 of FIG. 4) before a query is received from the web page (block 400 of FIG. 4).

Each of the databases referred to in the description may reside locally or remotely. In some implementations, the databases may reside on a local machine, such as a desktop computer, laptop, handheld device, etc. The databases may also reside remotely and connect to a QA system through a network, the Internet, or other type of networked data connection.

As will be appreciated by one skilled in the art, aspects of the present inventive subject matter may be embodied as a system, method and/or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present inventive subject matter may take the form of a computer program product embodied in a computer readable storage medium (or media) having computer readable program instructions embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present inventive subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present inventive subject matter.

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
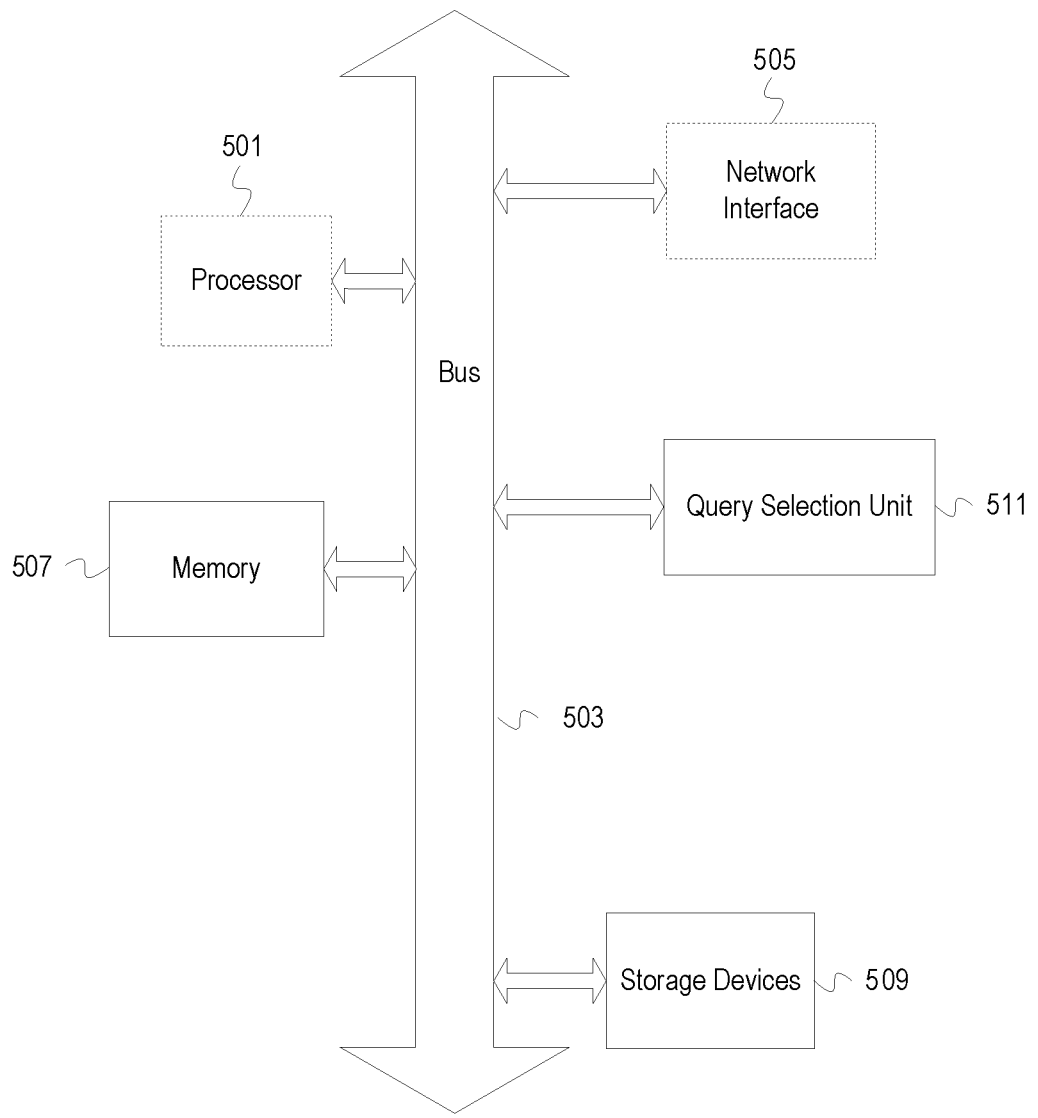
FIG. 5 depicts an example computer system that implements a query selection unit.

FIG. 5 depicts an example computer system with a query selection unit. A computer system includes a processor 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The query selection unit 511 embodies functionality to identify selected queries based on contextual information or client session data. The query selection unit 511 may perform operations that analyze a list of queries to determine relevance to contextual information, analyze user session data to determine queries most likely to be submitted, and a combination of those operations where queries are selected based on both contextual information and client session data. Any one of these functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501, the storage device(s) 509, and the network interface 505 are coupled to the bus 503. Although illustrated as being coupled to the bus 503, the memory 507 may be coupled to the processor 501.

While the embodiments are described with reference to various implementations and exploitations, it will be understood that these embodiments are illustrative and that the scope of the inventive subject matter is not limited to them. In general, techniques for dynamically grouping data sets as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the configurations may be implemented as a combined structure or component. Similarly, structures and functionality presented as a single component may be implemented as separate components. These and other variations, modifications, additions, and improvements may fall within the scope of the inventive subject matter.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}).

What is claimed is:

1. A method for generating a query list, said method comprising:
   determining, utilizing program instructions stored in a computer readable storage medium and executed by one or more processors, context data of a web page, wherein the context data includes textual data that describes subject matter displayed on the web page;
   receiving, by the one or more processors, a client query entered from a client-retrieved instance of the web page;
   determining, by the one or more processors, an identifier associated with the web page that distinguishes the web page from other web pages;
   in response to receiving the client query, retrieving, by the one or more processors from a database, a plurality of queries associated with the identifier;
   determining, by the one or more processors, whether one or more of the retrieved queries correlate the determined context data and the received client query;
   selecting, by the one or more processors, a set of one or more queries from the plurality of queries based, at least in part, on the selected set of one or more queries each having been determined to correlate the determined context data and the received client query; and
   sending, by the one or more processors, the selected set of one or more queries to the client-retrieved instance of the web page.

2. The method of claim 1, wherein said receiving the client query comprises receiving a first of one or more portions of the client query from the client-retrieved instance of the web page.

3. The method of claim 1 further comprising:
   storing the context data in a contextual information database; and
   retrieving the context data from the contextual information database based, at least in part, on the determined identifier.

4. The method of claim 1, wherein said selecting the set of one or more queries from the plurality of queries comprises one of:
   determining a number of times at least one of the plurality of queries has been received from other client-retrieved instances of the web page; or
   determining whether at least one of the plurality of queries has a specified answer.

5. The method of claim 1, wherein the context data comprises at least one of:
   contextual data determined from queries previously submitted from the client-retrieved instance of the web page;
   words from textual or graphical images displayed on the web page;
   a universal resource locator associated with the web page; or
   an interne protocol address associated with the web page.

6. The method of claim 1 further comprising:
   storing the received client query in a query database;
   receiving a second client query entered from the client-retrieved instance of the web page; and storing the second client query in the query database and associating the second client query with the client query.

7. The method of claim 6 wherein said retrieving from the database the plurality of queries comprises:
   determining a query identifier associated with the client query that distinguishes the client query from other client queries; and
   retrieving from the query database a plurality of queries associated with the query identifier.

8. The method of claim 7 wherein said selecting the set of one or more queries from the plurality of queries comprises:
   selecting a set of the plurality of queries that each have been previously received after an instance of receiving the client query; and
   sending the set of the plurality of queries to the client-retrieved instance of the web page.

* * * * *